W. E. THOROMAN.
MEASURING AND INDICATING ATTACHMENT FOR GASOLENE DISPENSING PUMPS.
APPLICATION FILED JAN. 27, 1919.
1,330,100.
Patented Feb. 10, 1920
2 SHEETS—SHEET 1.
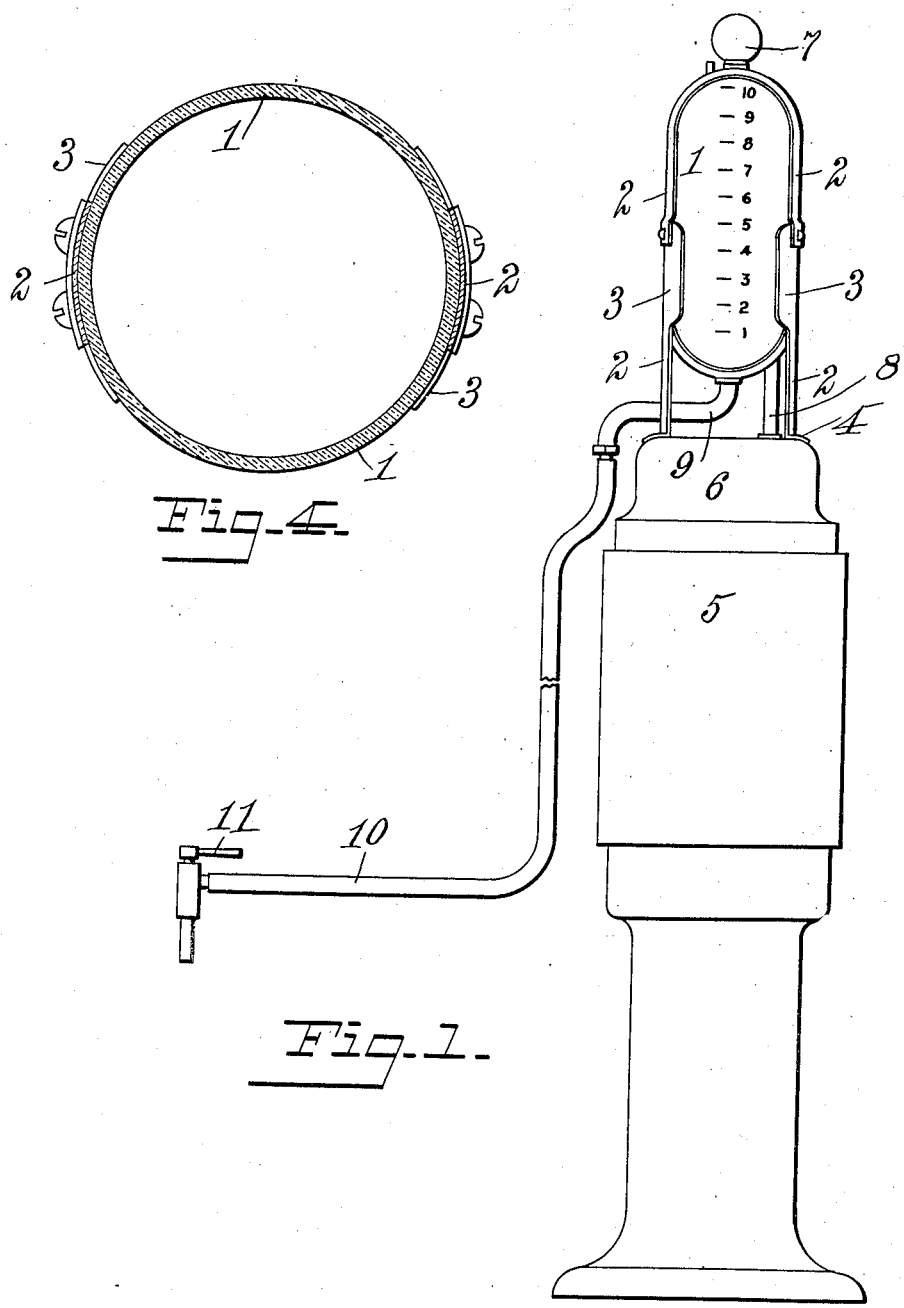

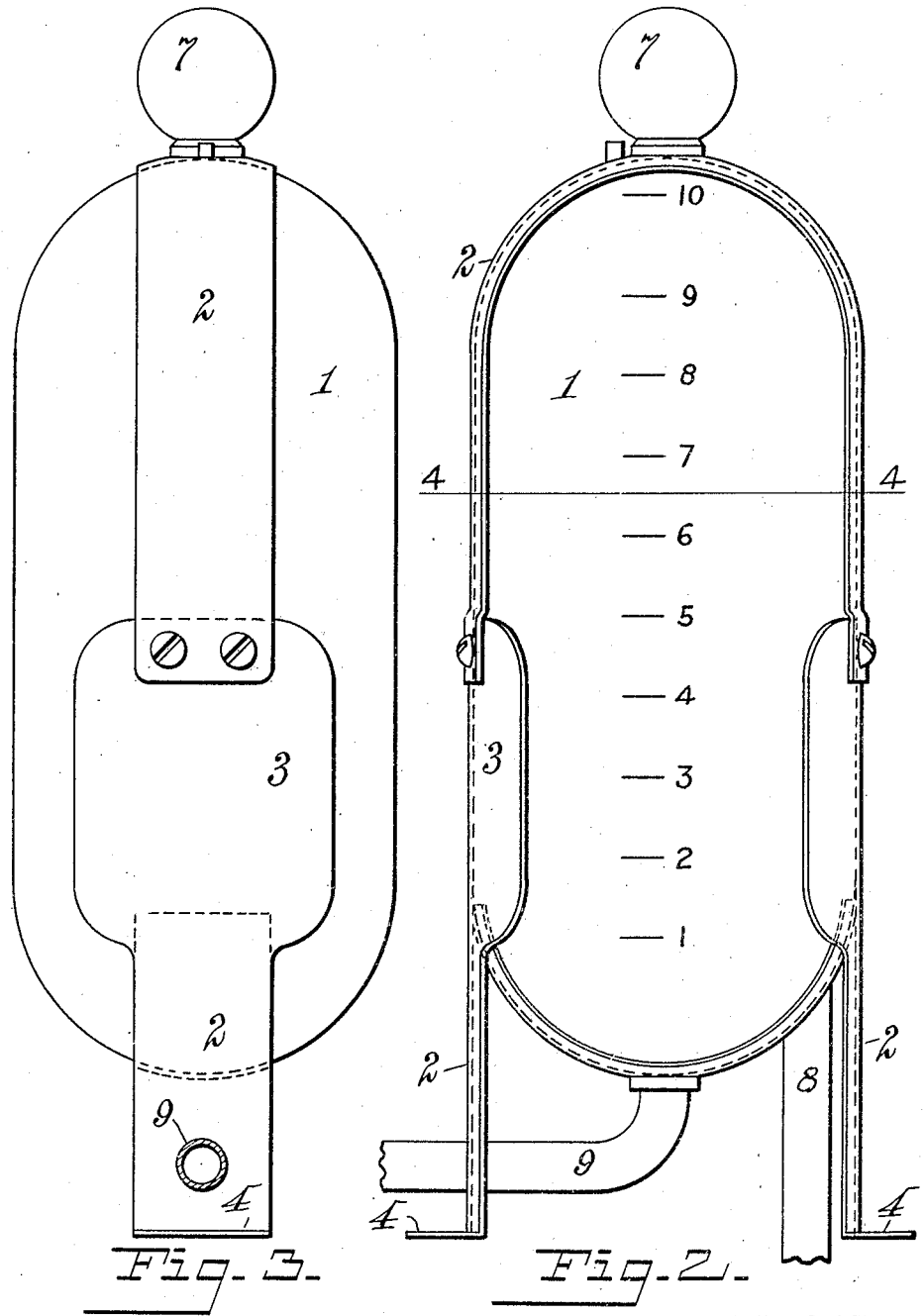

UNITED STATES PATENT OFFICE.

WILLIAM E. THOROMAN, OF DAYTON, OHIO.

MEASURING AND INDICATING ATTACHMENT FOR GASOLENE-DISPENSING PUMPS.

1,330,100.  Specification of Letters Patent.  Patented Feb. 10, 1920.

Application filed January 27, 1919. Serial No. 273,250.

*To all whom it may concern:*

Be it known that I, WILLIAM E. THOROMAN, a citizen of the United States, residing at Dayton, in the county of Montgomery and State of Ohio, have invented certain new and useful Improvements in Measuring and Indicating Attachments for Gasolene-Dispensing Pumps, of which the following is a specification.

My invention relates to improvements in gasolene measuring devices. The object of the invention is to provide a measuring receptacle having special features and a support therefor which are applicable to the gasolene dispensing pumps now in general use or which may be used entirely independent of gasolene pumps, for example where air is available as a means of forcing the gasolene from a supply or storage tank into the measuring receptacle.

In advance of a more minute description of my invention reference is made in general terms to the accompanying drawings which show the measuring device or appliance in use in connection with a conventional form of gasolene dispensing pump and also when used independently of such pump, for example in connection with an incased air motor for forcing the commodity out of a storage tank up and into the measuring device.

In the accompanying drawings, Figure 1 is a conventional form of gasolene dispensing pump in elevation having my measuring device applied thereto. Fig. 1ª represents an installation of the measuring device in connection with a storage tank and an incased air motor. Fig. 2, is a larger view of the measuring cylinder in elevation. The device in this view is removed from the gasolene pump as shown in Fig. 1. Fig. 3, is an enlarged side elevation of the measuring device looking upon it at a right angle to Fig. 2, and Fig. 4, is a sectional view on the line 4—4 of Fig. 2.

In a more particular description of the invention similar reference characters will indicate corresponding parts as they appear in the several views of the drawings.

As I have before indicated the invention comprises a gasolene quantity measuring and indicating device which may be mounted on the well known form of dispensing pump now commonly in use or it may be installed in connection with a supply tank and air motor. The measuring device itself consists of a glass receiver in the form of an oblong glass cylinder made of a heavy quality of glass with the ends thereof inclosed by oval or rounded forms which are integral continuations of the cylinder. Upon the front side of this cylinder is arranged a scale of figures reading from below upward and which indicate the gasolene in gallon quantities. In the present case, as it appears in Fig. 1, the capacity of the said cylinder is ten gallons. The cylinder is strapped or inclosed on the two opposite sides by metallic straps 2—2 which extend around the oval shaped top and bottom thereof and up the sides thereof and snugly embrace the said cylinder by conforming to the contour thereof. The lower ends of the bottom straps 2 terminate in feet 4 by means of which the device may be attached to the top of a pump 5 as shown in Fig. 1. This is in case the device is attached to the gasolene vending pump usually found at filling stations or in garages. It is there shown to be mounted on the dome 6 of the pump in a firm upright manner, the feet 4 conforming to the surface of the dome. The straps which hold the cylinder in position are increased in width on opposite sides forming shields, as at 3—3 to prevent any shifting of the cylinder and to hold it firmly in position. The top of the cylinder may have mounted on it a globe 7 inclosing a lamp which furnishes light for the indicating scale to be seen when gasolene is dispensed at night.

In case the measuring device is used on gasolene dispensing pumps to measure and indicate the quantity of gasolene discharged therefrom, a communication is afforded between the pump 5 and the measuring cylinder 1 through a pipe 8. When the pump is operated in the usual manner the gasolene passes into the cylinder to the height required and to the proper indication. The passage of the gasolene is apparent to the purchaser and guess-work and short measure are avoided. When the proper quantity of gasolene is admitted to the measuring cylinder, whether one, ten gallons or more according to the capacity of the cylinder, the pumping operation is stopped and the gasolene is discharged from the measuring cylinder through the hose 10, said hose being connected to the outlet pipe 9 which has a sealed connection with the bottom of the cylinder. The discharge of the gasolene from the measuring cylinder 1 is conveniently controlled by a valve 11. The outlet pipe 9 passes through an opening in one of the lower side straps 2 which incloses the cylinder and thereby the said pipe is securely supported in its position.

Owing to the formation of the cylinder 1 with the oval ends it is exceptionally strong and is capable of withstanding considerable usage.

Having described my invention, I claim:

A measuring appliance for gasolene pumps, comprising a glass cylinder oblong in shape with oval ends and containing thereon a numerical scale indicating the quantities of gasolene dispensed, metallic straps inclosing the oval ends and conforming to the contour of the cylinder transversely and longitudinally, the strap inclosing the upper oval end being extended down on the opposite sides of the cylinder, and metallic shields conforming to the contour of the cylinder and embracing the lower opposite sides of said cylinder, said shields terminating in legs which support the cylinder in an immovable upright position, substantially as described.

In testimony whereof I affix my signature.

WILLIAM E. THOROMAN.